United States Patent
Sanderson

(10) Patent No.: US 6,250,196 B1
(45) Date of Patent: Jun. 26, 2001

(54) ROTATABLE PINTLE ARM ASSEMBLY FOR SUPPORTING A MACHINE GUN

(76) Inventor: Paul H. Sanderson, 2019 Cripple Creek, Lewisville, TX (US) 75077

( * ) Notice: Subject to any disclaimer, the term of this patent is extended or adjusted under 35 U.S.C. 154(b) by 0 days.

(21) Appl. No.: 09/250,520

(22) Filed: Feb. 16, 1999

(51) Int. Cl.$^7$ .................................................. F41A 23/24
(52) U.S. Cl. ........................................ 89/37.16; 89/37.22
(58) Field of Search ............................... 89/37.16, 37.19, 89/37.21, 37.22

(56) References Cited

U.S. PATENT DOCUMENTS

| | | | |
|---|---|---|---|
| 2,111,008 | * 3/1938 | Smiling | 89/37.5 |
| 4,966,063 | 10/1990 | Sanderson et al. | 89/37.22 |
| 5,206,454 | 4/1993 | Sanderson | 89/33.14 |
| 5,390,582 | 2/1995 | Sanderson | 89/37.22 |
| 5,417,141 | * 5/1995 | Sanderson | 89/37.22 |
| 5,419,234 | 5/1995 | Sanderson | 89/37.22 |
| 5,458,045 | 10/1995 | Sanderson | 89/33.16 |
| 5,461,963 | * 10/1995 | Sanderson | 89/37.22 |

FOREIGN PATENT DOCUMENTS

8438 * 3/1919 (GB) ..................................... 89/37.5

* cited by examiner

*Primary Examiner*—Stephen M. Johnson
(74) *Attorney, Agent, or Firm*—Konneker & Smith, P.C.

(57) ABSTRACT

A central support plank section is transversely secured to the floor of a helicopter cabin area at exterior side wall door openings on opposite sides of the cabin area. Specially designed pintle arm assemblies are rotationally secured to opposite ends of the central support plank sections, with each of the pintle arm assemblies underlying and operatively supporting a cabin door area machine gun. Each pintle arm assembly is pivotable about a vertical axis in a manner permitting its machine gun to be horizontally swung into the cabin area to a stowed orientation therein, and is provided with a lock ring/detent structure that permits the pintle assembly to be quickly and easily locked in a selectively variable horizontal rotational orientation. An inboard post portion of the pintle arm assembly is rotatably secured to the central plank section by a specially designed securement structure that substantially reduces both rotational friction and horizontal and vertical "play" of the post portion at its juncture with the central plank section. An outboard post portion of the pintle arm assembly is spaced apart from the inboard post portion and is removably and rotatably connectable to its associated machine gun. In three disclosed embodiments thereof, the outboard post portion is (1) permanently secured to the balance of the pintle arm assembly, (2) a straight cylindrical post member removably received in a socket portion of the assembly, and (3) a tapered cylindrical post member removably received in a correspondingly tapered socket portion of the assembly.

29 Claims, 11 Drawing Sheets

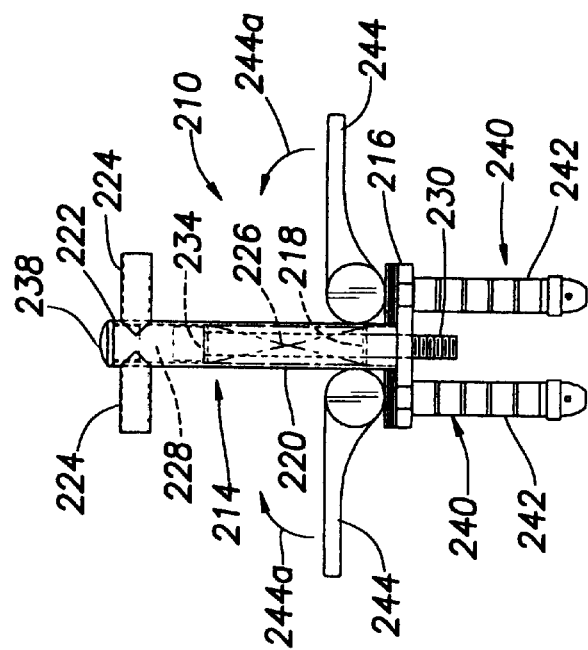
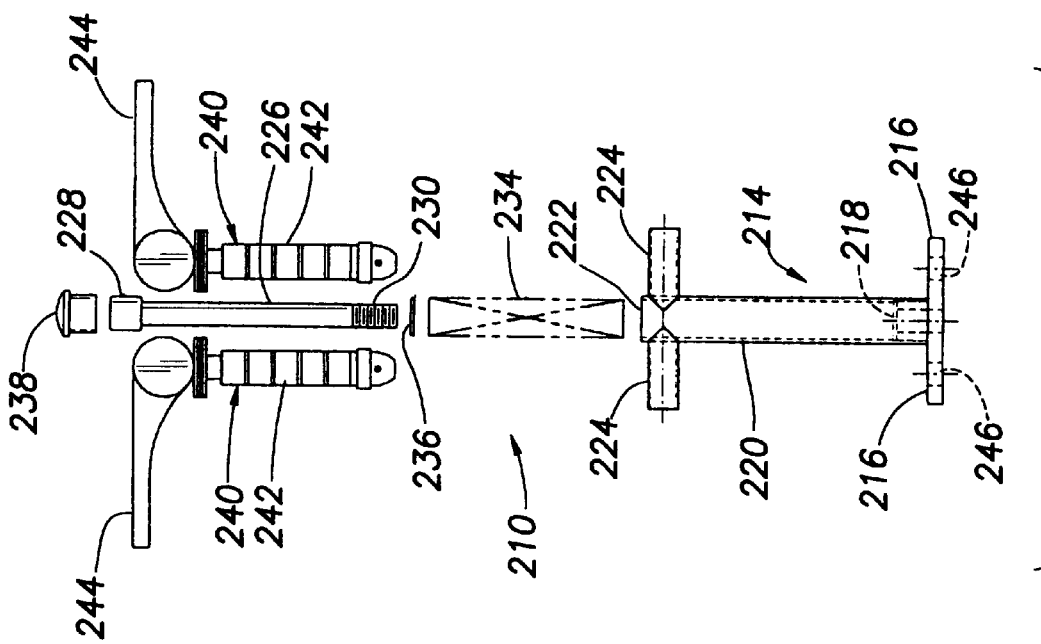

ROTATABLE PINTLE ARM ASSEMBLY FOR SUPPORTING A MACHINE GUN

BACKGROUND OF THE INVENTION

The present invention generally relates to armament apparatus and, in a preferred embodiment thereof, more particularly relates to a specially designed rotatable pintle arm assembly used to operatively mount a machine gun, representatively on an end of a support plank structure disposed within a helicopter cabin area at a door opening thereof.

In military helicopters, machine guns are often mounted in the cabin area inwardly adjacent a side door opening thereof so that the machine gun may be manually fired outwardly from the door opening area. Conventionally configured mounting structures for these machine guns are typically subject to several problems, limitations and disadvantages. For example, to reposition the gun from its firing orientation to a stowed orientation within the cabin area it is necessary to lift the gun and upwardly pivot it about a horizontal axis of its underlying support structure into the cabin area. This procedure must subsequently be reversed to later reposition the gun in its firing orientation. Because of the weight and bulk of the gun, this tends to be an awkward and difficult task. Additionally, it can be hazardous to the gun operator if, during the vertical pivoting of the gun, the gun or its associated mounting structure falls on the operator or pinches his hand or other body part.

A further problem typically associated with conventionally constructed machine gun mounting structures, particularly in this application, is that they tend to permit an undesirably large degree of "play" between the mounting structure and the underlying base structure to which it is secured. This mounting structure play undesirably reduces the aiming accuracy of the supported gun during firing thereof. Another disadvantage of a conventionally constructed machine gun mounting structure in this particular application is that its bottom portion which is anchored to the underlying support structure is maintained in a fixed relationship with such support structure. The result is that horizontal gun rotation can be achieved only at the juncture between the gun and the upper portion of the mounting structure that contacts and supports the gun.

As can be readily seen from the foregoing, a need exists for an improved machine gun mounting structure which addresses these problems, limitations and disadvantages. It is to this need that the present invention is directed.

SUMMARY OF THE INVENTION

In carrying out principles of the present invention, in accordance with a preferred embodiment thereof, a specially designed rotatable pintle arm assembly is provided for mounting a machine gun on a support structure in a manner permitting the pintle arm assembly to be rotated about a vertical axis and permitting the pintle arm assembly to be releasably locked in a selected rotational orientation about such vertical axis.

In an illustrated preferred embodiment thereof, the pintle arm assembly is incorporated in aircraft armament apparatus comprising a support plank structure mountable on the floor of an aircraft cabin area in a manner such that the support plank structure longitudinally extends generally between opposite outer side wall door openings of the cabin area. The support plank structure representatively includes elongated front and rear spar members between which a honeycombed metal core section is disposed, the core section having metal covering skin structures extending along its top and bottom sides. The support plank structure preferably has an outer end portion partially defined by a specially designed pintle mounting block structure having top and bottom sides, and a mounting opening extending vertically therethrough about a vertical axis.

According to a feature of the invention, the pintle mounting block structure is secured to and interlocked with the support plank structure in a manner such that at least substantial portions of end loads imposed on the plank structure are transferred through the pintle mounting block structure to the core portion of the plank structure. Illustratively, the pintle mounting block structure has forwardly and rearwardly projecting tongue portions which are complementarily received in corresponding spar end grooves and secured therein by suitable fasteners, and inwardly projecting top and bottom side flanges which overlap and are suitably secured to the top and bottom covering skin portions of the plank core structure.

The pintle arm assembly preferably includes a vertically orientable inboard post structure having a lower end section receivable in the pintle block mounting opening of the plank structure, an outboard post structure horizontally offset from the inboard post structure and being supportingly connectable to the machine gun, and an elongated support member having opposite first and second end portions. The support member extends between the inboard and outboard post structures with its first and second opposite end portions being respectively secured thereto.

The armament apparatus also includes securement structure for securing the lower end section of the inboard post structure within the pintle block mounting opening in a manner such that the pintle arm assembly projects upwardly from the outer plank end portion and is rotatable relative thereto about the previously mentioned vertical axis. Locking structure is also provided and is operative to releasably lock the pintle arm assembly relative to the outer end portion of the support plank structure in a selectively variable rotational orientation about the vertical pintle arm assembly pivot axis. The ability to pivot the pintle post about a vertical axis permits the machine gun which it operatively supports to be horizontally swung into and out of the aircraft cabin area without having to lift the gun and pivot it about a horizontal axis.

The securement structure representatively includes first and second annular tapered roller bearing structures having cone portions and being receivable in the plank end portion mounting portion in a circumscribing, axially spaced relationship on the lower end section of the inboard post structure, and in an axially oppositely oriented relationship with one another. A tightening structure, representatively a tightening nut, is used to axially lock the lower end section of the inboard post structure within the plank mounting opening and exert axially inwardly directed forces on the cone portions of the first and second tapered bearing structures. This causes the inboard post assembly to be very firmly braced against both axial and lateral play relative to the support plank, thereby substantially improving the supported machine gun's aiming accuracy during firing thereof.

The locking structure preferably includes a first detent structure having a spaced series of openings therein, a second detent structure having a locking member disposed thereon and movable into and out of a selectively variable one of the series of openings, and attachment structure for fixedly attaching one of the first and second structures to the support plank structure outer end portion, and for attaching the other one of the first and second detent structures to the inboard post structure for rotation therewith about the vertical pintle assembly pivot axis to receivingly align a selected one of the series of openings with the locking member.

Illustratively, the first detent structure is a lock ring member anchored to the plank end portion and through which the lower end section of the inboard post structure may be extended, the series of openings being circumferentially spaced around the lock ring and extending axially therethrough. The second detent structure is anchored to the inboard post for rotation therewith about the vertical pintle arm assembly pivot axis and includes a spring-loaded expansion pin extendable into and removable from a selected one of the series of lock ring openings.

In one embodiment thereof, the outboard post structure includes a vertical stud member rotatably connectable to the machine gun and fixedly secured to the second end portion of the elongated support member. In a second embodiment thereof, the outboard post structure includes a socket member anchored to the second end portion of the support member, a stud member removably receivable in the socket member and rotatably connectable to the machine gun, and fastening structure, such as a bolt or ball lock pin, is provided for releasably retaining the stud member in the socket member.

In a third embodiment of the outboard post structure, a modified version of the socket-based second embodiment, the socket member extends along an axis and has first and second axially spaced apart conically tapered annular interior side surface areas. The stud member has a radially enlarged external portion with a conically tapered outer side surface portion positioned and configured to complementarily engage the first conically tapered annular interior side surface area of the socket member when the stud member is operatively received in the socket member. The fastening structure includes a lock nut threadable onto an end of the stud member, and a split annular tapered collet member positionable around the stud member and being axially drivable into engagement with the second tapered annular interior side surface area of the socket member by the lock nut as the lock nut is threadingly tightened onto the stud member. This tapered stud/socket interfit substantially eliminates axial and lateral play of the stud relative to the socket member.

The armament apparatus also representatively includes an outboard plank section removably connectable to the outer end of the support plank structure to define a longitudinal extension thereof, the outboard plank section having support structures disposed thereon and useable to removably secure weaponry thereto. According to a feature of the invention, the outboard plank section has a downwardly and longitudinally outwardly sloping top side surface.

According to another aspect of the invention, a special method is provided for securing an end portion of aircraft armament support plank to a floor section of an aircraft cabin area, the floor section having a structural beam member underlying a removable floor panel. The method is initiated by removing the floor panel to expose a portion of the underlying structural beam member through a floor opening previously covered by the floor panel. The portion of the structural beam member is reinforced, preferably by attaching a skin doubler plate member thereto.

After the floor panel is removed, a portion is removed therefrom. The remaining portion of the removed floor panel is then reattached to the floor section over a portion of the floor opening. A plank mounting panel is then secured to the floor section over the portion of the floor opening left uncovered by the reattached remaining portion of the removed floor panel in a manner such that a portion of the plank mounting panel rests on the reinforced structural beam member portion.

The plank mounting panel preferably has a pair of strut recesses formed in the top side thereof, and a pair of pin recesses formed in the top side of the panel between the strut recesses. Pin members are disposed within the pin recesses and secure a pair of mounting struts to the mounting panel for pivotal movement between first positions in which the struts project upwardly from the top side of the panel, and second positions in which they are swung down into their associated strut recesses. With the plank mounting panel attached to the floor section as described above, the struts are swung up to their first positions and secured to the plank end that overlies the panel. In this manner, vertical loads, for example from the pintle arm assembly and the machine gun which it underlies and supports, are transferred to the reinforced beam portion through the plank mounting panel.

BRIEF DESCRIPTION OF THE DRAWINGS

FIG. 11 is a reduced scale exploded side elevational view of the detent assembly;

FIG. 12 is a reduced scale assembled side elevational view of the detent assembly;

DETAILED DESCRIPTION

Figure 1:
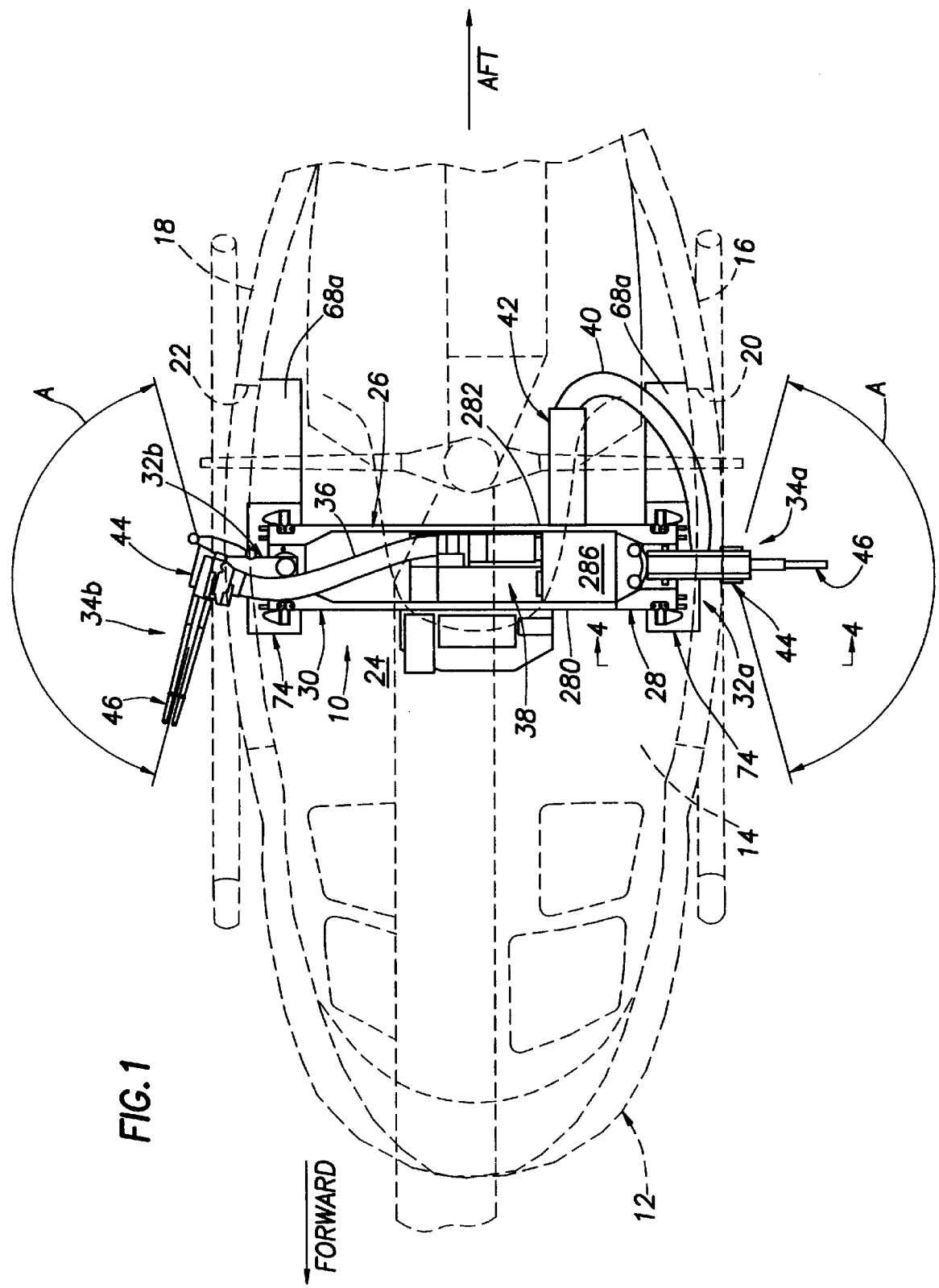
FIG. 1 is a phantomed top plan view of a portion of an aircraft, representatively a helicopter, having a cabin area through which a central section of a support plank transversely extends, the central plank section having on its opposite ends specially designed rotatable pintle arm assemblies that embody principles of the present invention and operatively support machine guns adjacent opposite cabin door areas of the helicopter.
Figure 2:
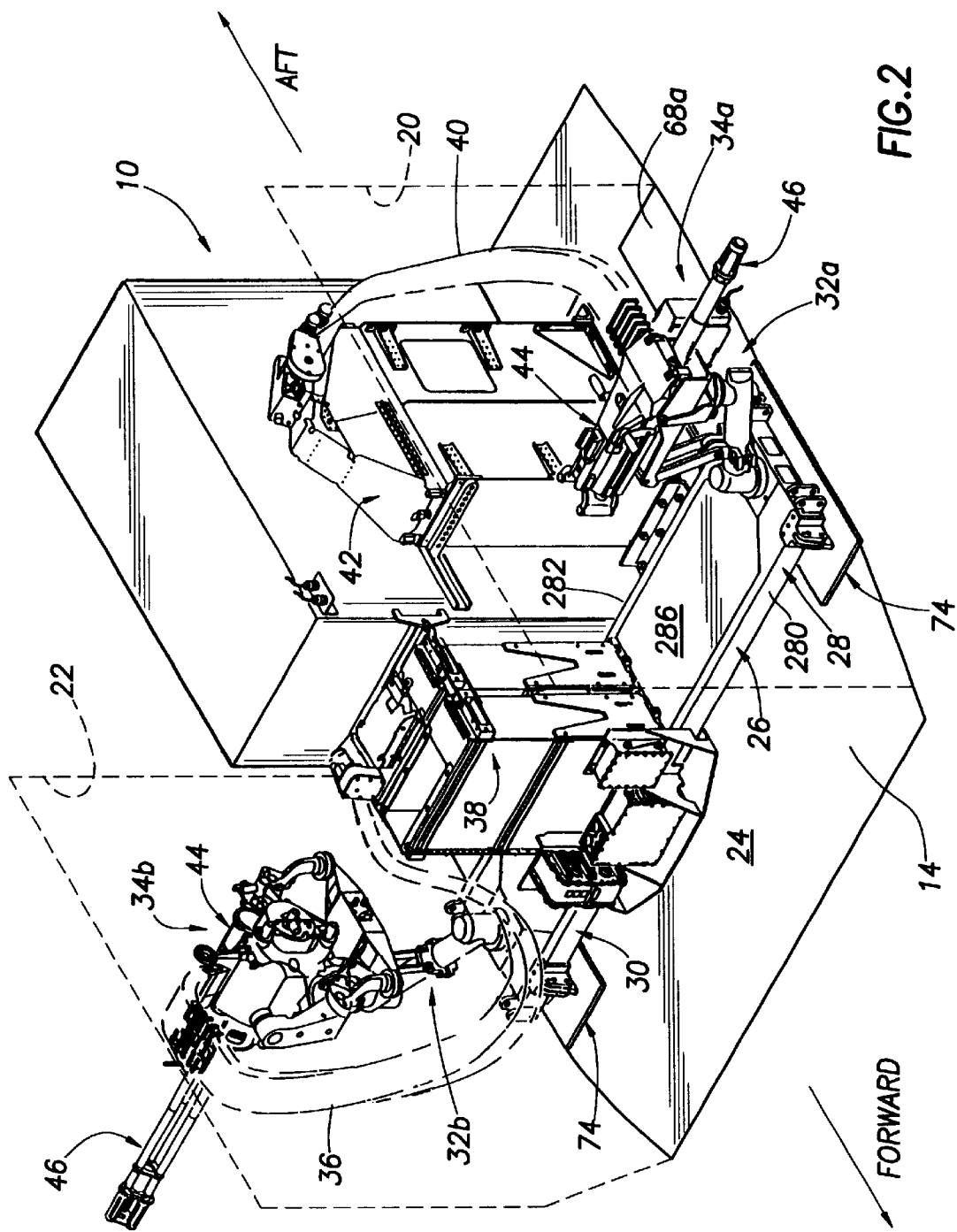
FIG. 2 is an enlarged scale left front perspective view of the central plank section, the pintle arm assemblies, the machine guns, and associated armament apparatus within the cabin area of the helicopter.

Referring initially to FIGS. 1 and 2, the present invention provides armament apparatus 10 which is mounted in an aircraft, representatively a helicopter 12, having a cabin area 14 disposed between opposite left and right outer side wall portions 16,18 of the helicopter 12. The opposite outer side wall portions 16,18 respectively have door openings 20,22 formed therein, with the floor 24 of the cabin 14 extending between such door openings. While the armament apparatus 10 will be representatively described herein as being incorporated in a helicopter, it will be readily appreciated by those of skill in this particular art that it also could be advantageously incorporated in other types of aircraft such as a fixed wing aircraft.

The armament apparatus 10 includes an elongated metal or composite material central support plank section 26 which is longitudinally extended transversely through the cabin area 14, is anchored to the floor 24 of the cabin area 14, and is illustratively disposed entirely within the cabin area 14. With the exceptions noted below, the central support plank section 26 is of a construction similar to that of the support plank structure illustrated and described in, for example, U.S. Pat. No. 4,966,063 to Sanderson et al. The opposite left and right ends 28,30 Of the central plank section 26 are respectively positioned inwardly adjacent the left and right outer sides 16,18 of the helicopter.

As shown in FIGS. 1 and 2, the armament apparatus 10 also includes a pair of specially designed pintle arm assemblies 32a and 32b which are of identical constructions and embody principles of the present invention. Pintle arm assemblies 32a,32b respectively project upwardly from the plank section ends 28,30 and are mounted thereon, as later described herein, for pivotal movement relative thereto about vertical axes. The pintle arm assemblies 32a,32b respectively underlie and operatively support at the cabin door openings 20,22 machine guns 34a and 34b.

Machine gun 34b is representatively a 0.50 caliber machine gun fed with belted ammunition 36 from an ammunition feed and storage system 38 mounted atop a longitudinally central portion of the plank section 26. Machine gun 34a is representatively a 40 mm machine gun fed with belted ammunition 40 from an ammunition feed and storage system 42 supported on the cabin area floor 24 behind a left end portion of the plank section 26. Each of the machine guns 34a,34b has a body portion 44 from which a barrel structure 46 forwardly projects. As illustrated in FIG. 1, the machine guns 34a,34b are horizontally rotatable relative to their underlying pintle arm assemblies 32a,32b through azimuth angles A. Each machine gun is also vertically rotatable relative to its associated pintle arm assembly through a predetermined elevation angle. While the machine guns 34a,34b have been representatively illustrated as being of different sizes, they could of course be identical to one another if desired. Additionally, the machine guns could be of types other than the illustrated 0.50 caliber and 40 mm machine guns if desired.

Figure 4:
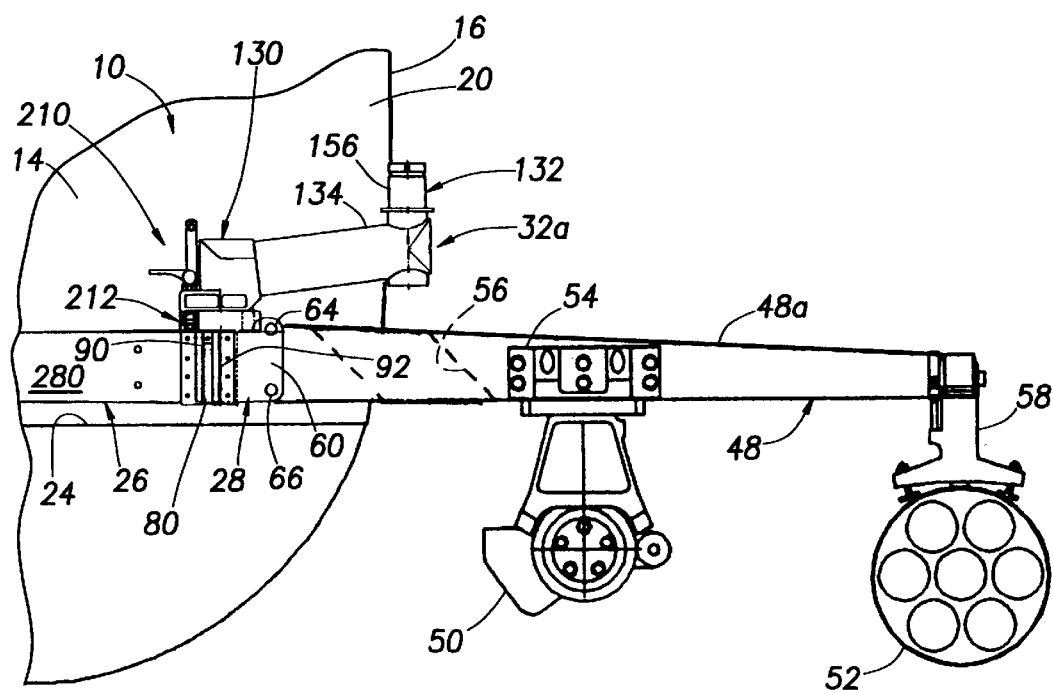
FIG. 4 is an enlarged scale front side edge elevational view, taken generally along line 4—4 of FIG. 1, of an end portion of the central plank section and its associated pintle arm assembly, with its machine gun removed, and further illustrating a tapered outer plank end section operatively secured to the end of the central plank section and projecting outwardly through the adjacent cabin door opening.

FIG. 4 is a somewhat simplified rearwardly directed front side edge elevational view of a left end portion of the central plank section 26 and its associated pintle arm assembly 32a with the machine gun 34a removed therefrom for illustrative purposes. FIG. 4 also illustrates that the armament apparatus 10 may also include an outboard support plank section 48 which is removably connected to the left end 28 of the central plank section 26 and forms a horizontally outward extension thereof, outboard of the helicopter side wall 16, which carries additional weaponry representatively in the form of a 7.62 mm mini-gun 50 and a 7-tube rocket launcher 52. A similar outboard support plank section and associated weaponry can also be mounted on the right end 30 of the central plank section 26.

The mini-gun 50 is removably mounted beneath a longitudinally central portion of the outboard plank section 48 by support structures 54 on the front and rear side edges of the plank section 48 and may be fed with belted ammunition (not shown) via a sloped feed slot 56 extending downwardly through an inner end portion of the plank section 48, and the rocket launcher 52 is removably secured beneath the outer end of the plank section 48 by a support structure 58 mounted on the outer tip of the plank section 48. Other types of weaponry may be mounted on the outboard plank section 48, the mini-gun 50 and rocket launcher 52 being merely representative of various types Of weapons that may carried thereon.

According to an aspect Of the present invention, the top side 48a of the outboard plank section 48 is downwardly and horizontally outwardly sloped to reduce the weight and forward aerodynamic drag surface area of the plank section 48. In other regards, such as the general construction of the plank section 48 and the configurations of the weaponry support structures 54 and 58, the outboard plank section 48 is generally similar to the outboard support plank portions illustrated and described in U.S. Pat. No. 4,966,063 to Sanderson et al. The inboard end of the outboard plank section 48 has spaced apart lug pairs (not shown) which are interdigitated with corresponding lug pairs 60,62 on the left end 28 of the central plank section 26 (see FIG. 3) and removably pinned in place thereto with suitable upper and lower pin members 64 and 66.

Each of the opposite ends 28,30 Of the central plank section 26 is secured to the cabin area floor 24 in a unique load transferring manner which will now be described in conjunction with the left central plank section end 28 illustrated in FIG. 3. On opposite sides of the cabin floor 24 in the illustrated helicopter 12, adjacent each of its door openings 20 and 22, is a removable floor panel 68 that covers a floor opening 69. Each floor panel 68 is of a generally rectangular configuration that is elongated in a front-to-rear direction and has an inner side edge portion which overlies and rests upon an underfloor support beam 70 that longitudinally extends parallel to the length of the overlying floor panel 68.

To operatively secure the central plank section 26 to the cabin floor 24, each of the existing floor panels 68 is removed, and a skin doubler panel member 72 (see FIG. 3) is suitably secured to the outboard side of the beam 70 beneath the floor opening 69. Alternatively, the skin doubler panel member 72 could be suitably secured to the inboard side of the beam 70. A front portion of the floor panel 68 is removed, and the remaining rear portion 68a of the panel 68 is resecured to the floor 24. The resulting uncovered forward portion of the floor opening 69 is then covered by a specially designed plank mounting plate 74 removably secured to the floor 24 by, for example, screws 76.

Figure 3:
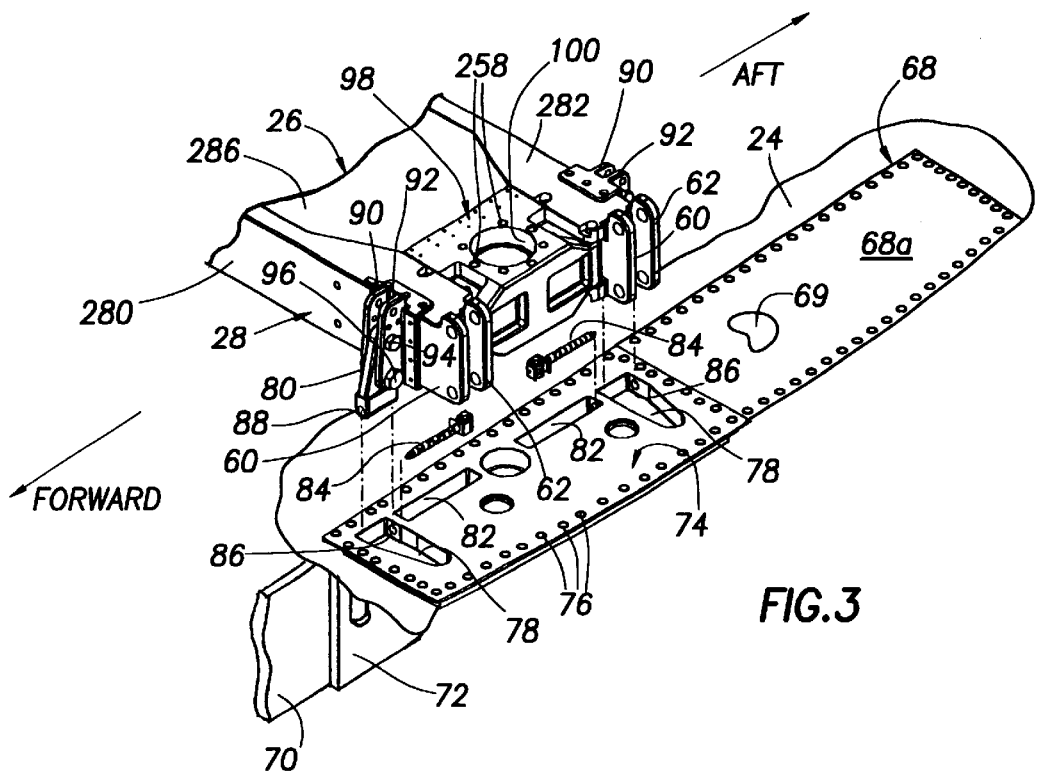
FIG. 3 is an enlarged scale partially exploded perspective view of an end portion of the central plank section and its associated cabin floor mounting structure.

Still referring to FIG. 3, each mounting plate 74 has an elongated, generally rectangular configuration and an inner side edge portion that rests upon one of the underlying beams 70 which are reinforced in these areas by the skin doubler panel members 72 thereon. At the opposite ends of each mounting plate 74 are two top side recesses 78 that complementarily receive a pair of support struts 80. Extending between the strut recesses 78 are a spaced pair of elongated recesses 82 that receive connector pins 84. Pins 84 extend through aligned plate holes 86 and strut holes 88 and secure the struts 80 to the plate 74 for pivotal movement relative thereto between a vertical orientation (shown in FIG. 3) and a horizontal orientation in which the struts 80 are complementarily received in their associated plate recesses 78.

To secure the central plank section 26 to the cabin floor 24, the struts 80 are pivoted upwardly to their vertical orientations and placed between lug pairs 90,92 suitably secured to the front and rear side edges of the central plank section ends 28 and 30. The vertically oriented struts 80 are then removably secured between adjacent lug pairs 90,92 by suitable fasteners 94,96 extended through aligned mounting holes in the struts 80 and lug pairs 90,92. With the opposite ends 28,30 of the central plank section 26 secured to the mounting plate 74 in this manner, plank end loads (from, for example the machine guns and their associated pintle arm assemblies) are efficiently transferred through the plates 74 to the underlying reinforced portions of the beams 70 instead of being imposed directly on the cabin floor structure 24.

Figure 5:
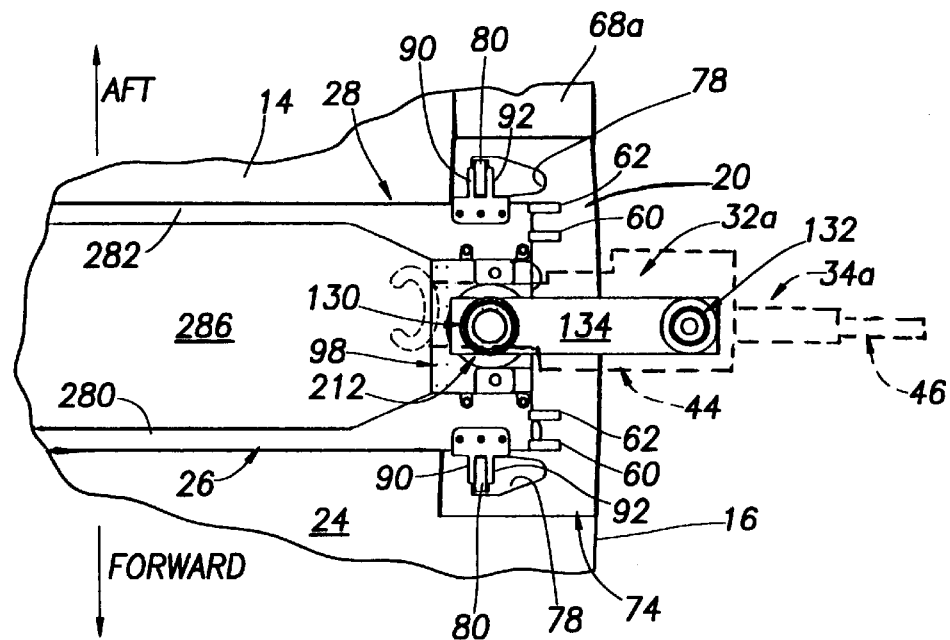
FIG. 5 is an enlarged scale partially phantomed top plan view of a left end portion of the central plank section and its associated pintle arm assembly and supported machine gun, with the machine gun in a firing orientation in which it projects outwardly through the adjacent cabin door opening.
Figure 6:
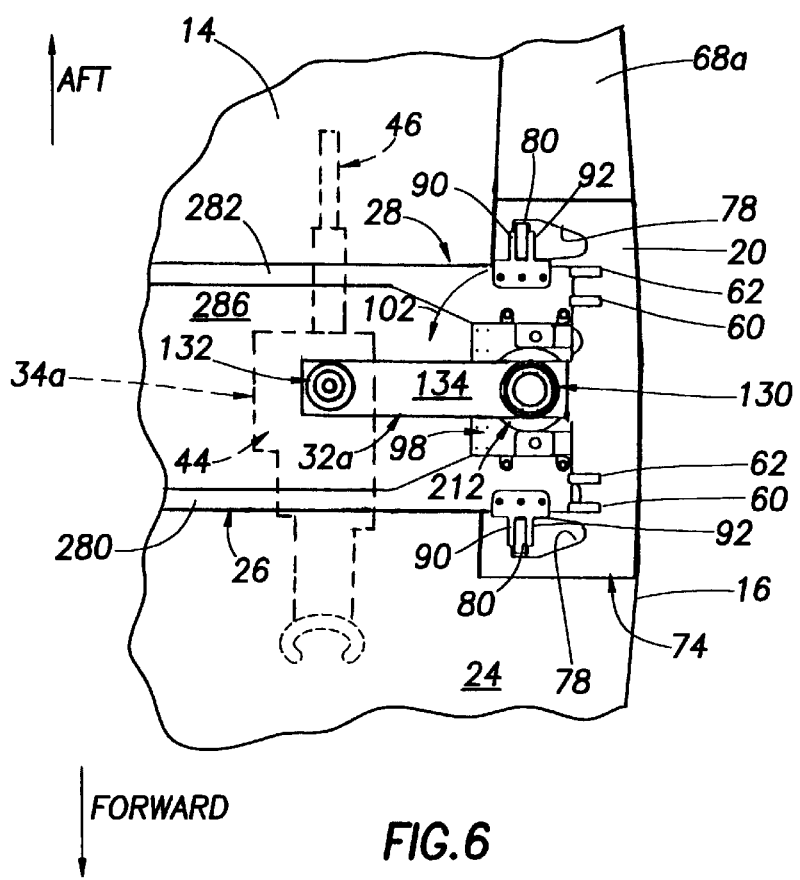
FIG. 6 is a view similar to that in FIG. 5, but with the machine gun and its associated pintle arm assembly being pivoted inwardly, about a vertical axis, to stowed orientations within the cabin area.

At each of the opposite ends 28,30 of the central support plank section 26 a specially designed pintle mounting block structure 98 is secured as later described herein, each pintle mounting block structure 98 having a circularly cross-sectioned hole 100 therein which extends between its opposite top and bottom sides. In a manner subsequently described herein, these mounting block holes 100 are used to support the pintle arm assemblies 32a,32b for rotation relative to the central plank section 26 about vertical axes. This uniquely permits each of the machine guns, for example the machine gun 34a shown in phantom in FIGS. 5 and 6, to be stowed within the cabin area 14 simply by horizontally rotating the pintle arm assembly 32a, as indicated by the arrow 102 in FIG. 6, from its FIG. 5 operating position to its FIG. 6 stowage position in which the machine gun 34a is horizontally swung into the cabin area 14 to a rearwardly facing orientation in which its barrel structure 46 is preferably lowered. Importantly, this in-cabin stowage of the machine gun 34a (and similarly for the other machine gun 34b) is achieved without having to lift the gun and pivot it into the cabin about a horizontal axis, and subsequently lift the gun to pivot it about such horizontal axis back to the operating orientation of the gun.

Figure 7:
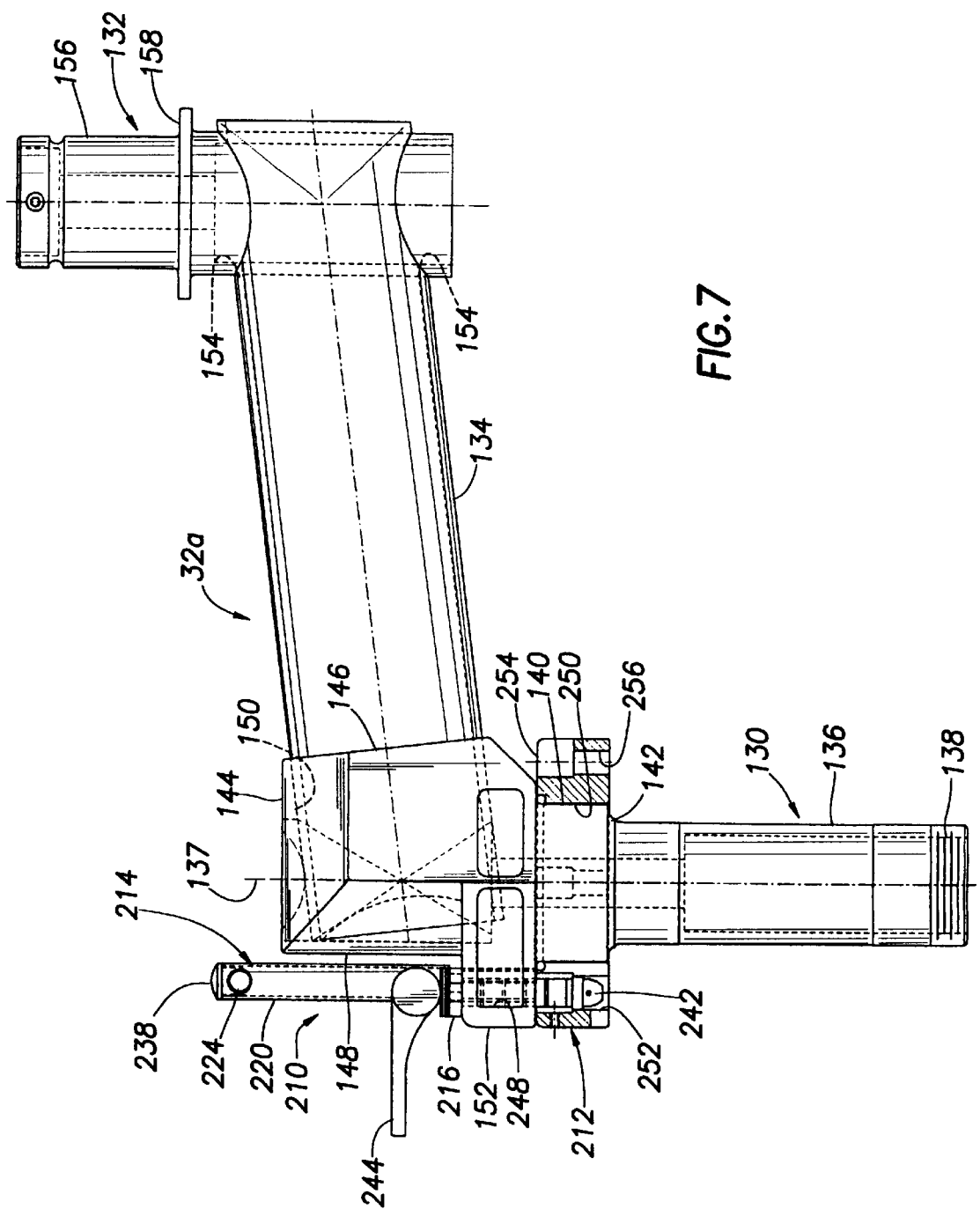
FIG. 7 is an enlarged scale side elevational view of one of the pintle arm assemblies, and an associated lock ring structure, removed from the central plank section.

The general structure of the pintle arm assemblies will now be described in conjunction with pintle arm assembly 32a shown in FIG. 7, it being understood that the structure of pintle arm assembly 32b is identical. Pintle arm assembly 32a includes a vertical inboard post structure 130, a vertical outboard post structure 132 horizontally and upwardly offset from the inboard post structure 130, and a support member in the form of a tube 134 that interconnects the inboard and outboard post structures 130 and 132. Alternatively, if desired, the vertical offset between the inboard and outboard post structures 130,132 could be eliminated so that the support tube 134 longitudinally extends in a horizontal direction between the inboard and outboard post structures 130,132.

Figure 10:
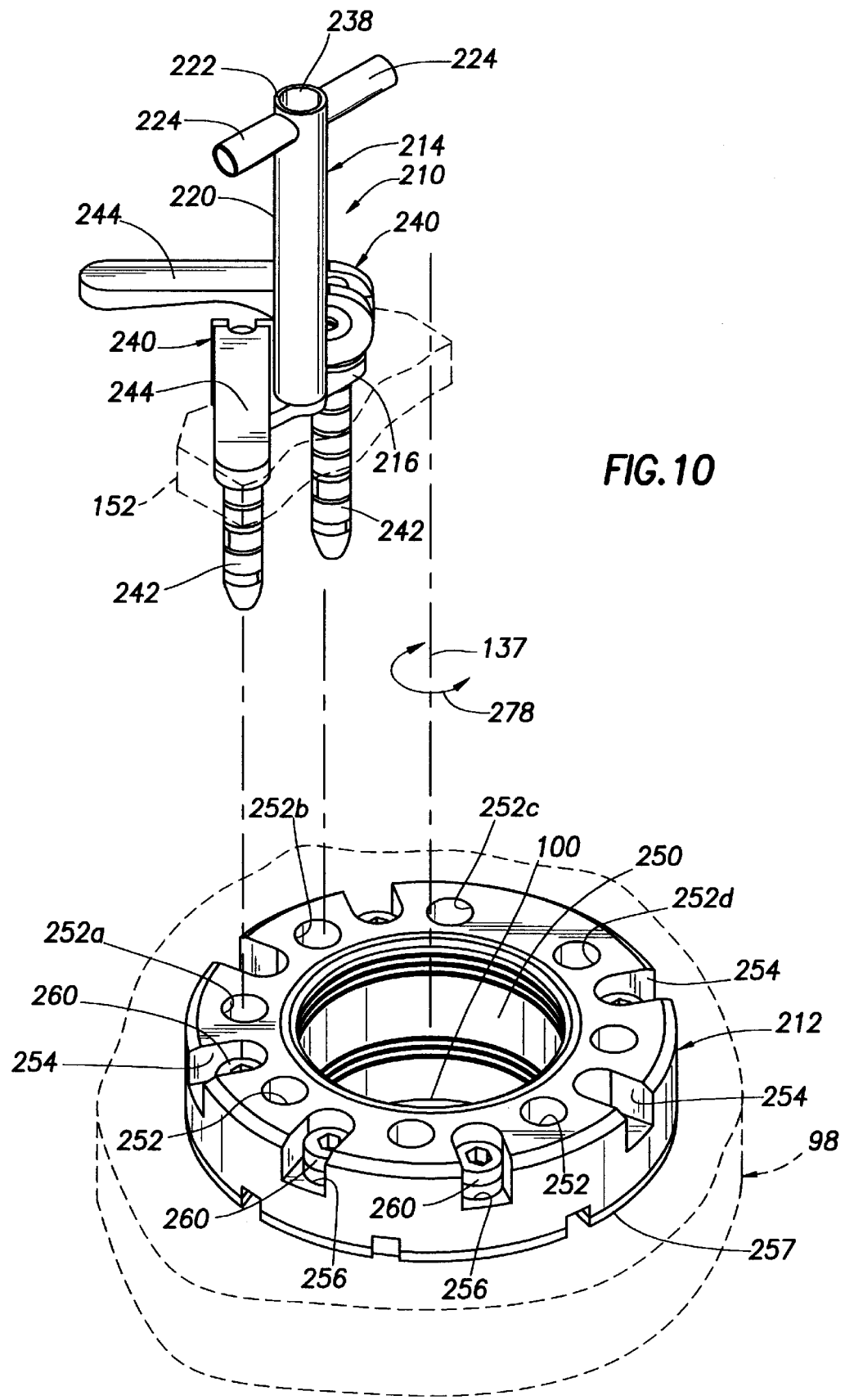
FIG. 10 is an enlarged scale exploded perspective view of the lock ring and an associated rotational detent structure carried by an inboard post portion of the pintle arm assembly.

Inboard post structure 130 has a tubular lower end portion 136 which, as later described herein, is rotatably received in the opening 100 (see FIG. 3) of the pintle mounting block structure 98 on the left end 28 of the central support plank section 26 to permit the pintle arm assembly 32a, and thus the machine gun 34a mounted thereon, to be rotated about a vertical axis 137 (see FIGS. 7 and 10) relative to the helicopter 12. A lower end section of the tubular portion 136 is externally threaded as at 138. At the upper end of the tubular portion 136 is a larger diameter tubular intermediate portion 140, with an annular arcuate surface area 142 being disposed at the juncture of the tubular portions 136,140. A laterally enlarged upper end portion 144 of the inboard post structure 130 extends upwardly from the intermediate portion 140 and has a leftwardly and upwardly sloped first side 146 and an opposite, generally vertical second side 148. A circular bore 150 extends transversely inwardly through the sloped first side 146, and a flange 152 horizontally extends outwardly from a bottom section of the second side 148 of the upper end portion 144.

A left or inboard end portion of the support tube 134 (as viewed in FIG. 7) is received in the bore 150 and suitably welded in place therein. A vertical circular bore 154 is extended downwardly through a right or outboard end portion of the support tube 134. The outboard post structure 132 is defined by a tubular gun mounting stud 156 having a lower end portion received and suitably welded within the bore 154 to thereby permanently anchor the stud 156 to the support tube 134. An upper end portion of the stud 156 is appropriately configured so as to be rotatably receivable in a yoke portion of the machine gun 34a, and an annular flange 158 is formed on the stud 156, with the flange 158 being positioned upwardly adjacent the top side of the right end of the support tube 134. Flange 158 supports the azimuth stop plate (not shown) of the machine gun 34a, with the azimuth stop plate being operative to maintain the predetermined azimuth rotation angle A of the gun 34a (see FIG. 1). Because the stud 156 is fixedly anchored to the support tube 134, there is no vertical or horizontal "play" between the stud 156 and the balance of the pintle arm assembly 32a.

Figure 13:
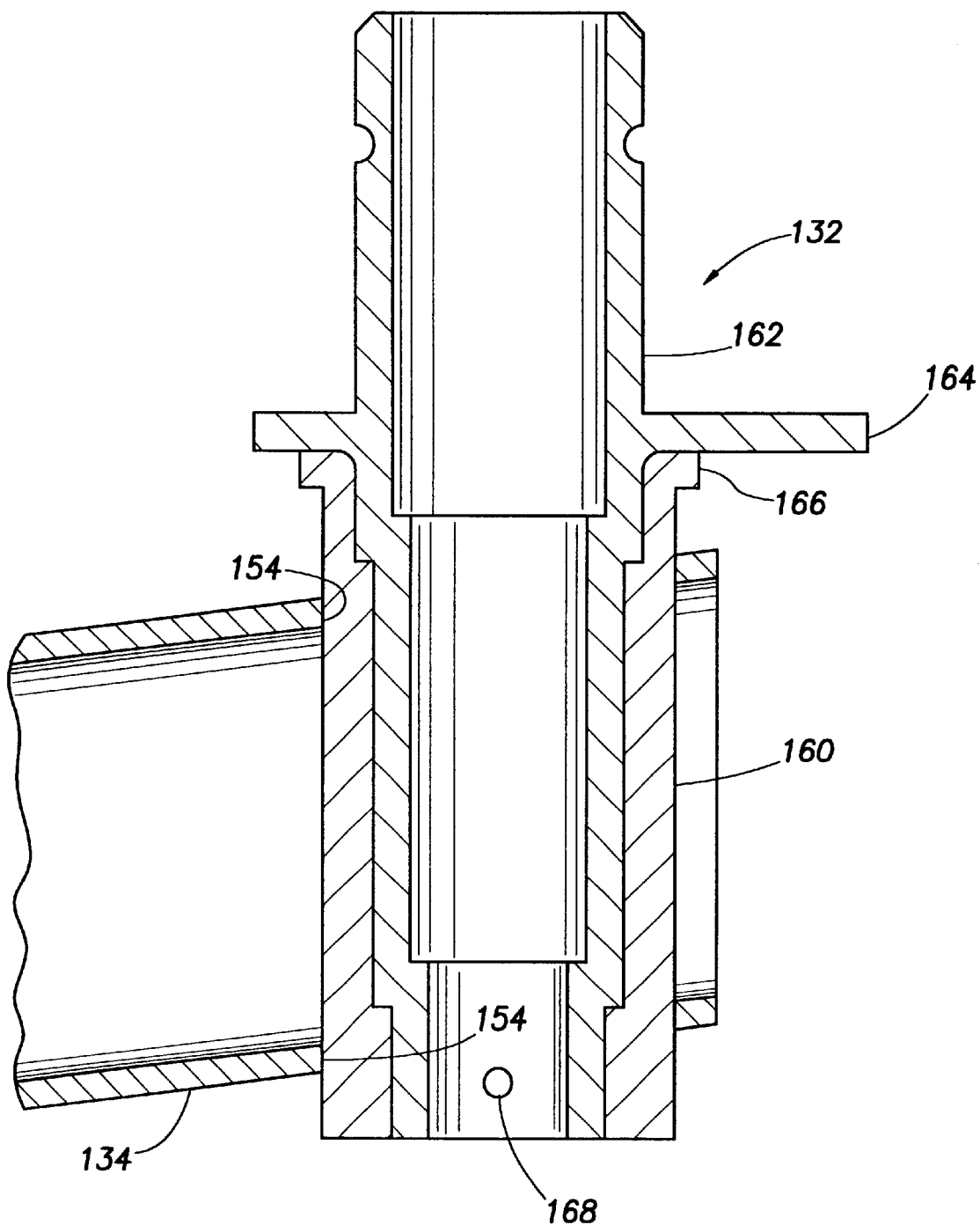
FIG. 13 is an enlarged scale cross-sectional view of a first alternate embodiment of the outboard post portion of the pintle arm assembly shown in FIG. 7.

A first alternate embodiment 132a of the previously described outboard structure 132 is cross-sectionally depicted in FIG. 13 and includes a tubular socket member 160 received and suitably welded within the circular bore 154 in the right or outboard end of the support tube 134, and a tubular mounting stud 162 having a lower end portion removably and complementarily received in the socket 160. A vertically intermediate portion of the stud 162 has an azimuth stop plate 164 formed thereon and resting on an annular upper end flange portion 166 of the socket 160. The upper end portion of the stud 162 above its azimuth stop plate portion 164 is rotatably receivable in a yoke portion of the machine gun 34a.

The stud 162 is releasably retained in the socket 160 by a suitable pin member 168 extending transversely through lower end portions of the socket and stud 160,162. In the event that the stud 162 becomes worn, it can be easily and quickly replaced by removing the pin 168, lifting the stud 162 out of the socket 160, inserting a new stud in the socket 160 and then pinning the replacement stud within the socket 160.

Figure 16:
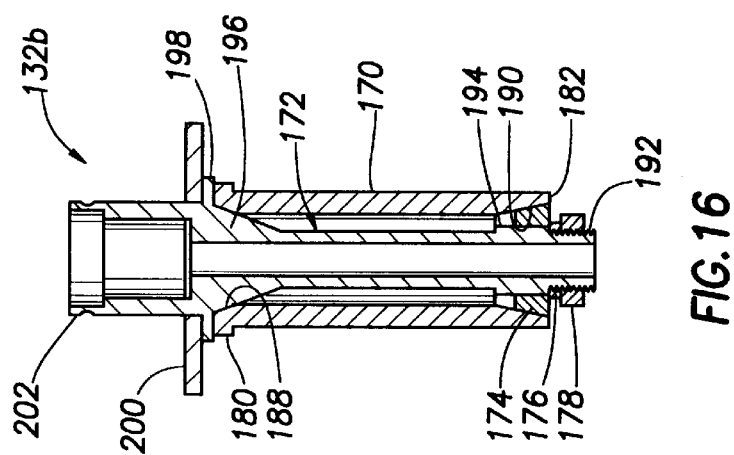
FIG. 16 is an enlarged scale cross-sectional view through the second outboard post portion embodiment taken generally along line 16—16 of FIG. 15.
Figure 15:
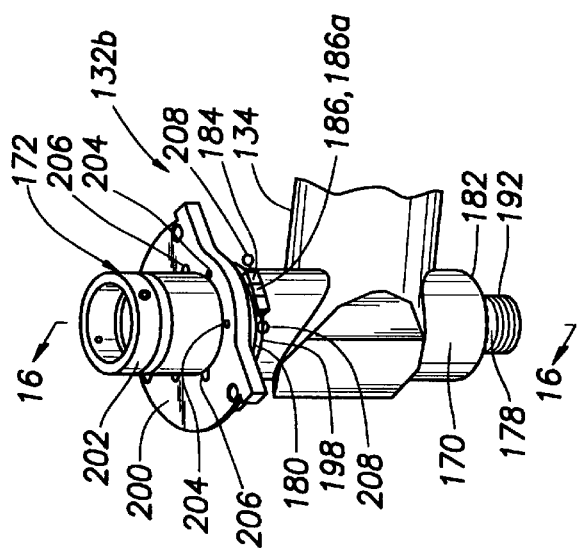
FIG. 15 is an assembled perspective view of the FIG. 14 outboard post portion.
Figure 14:
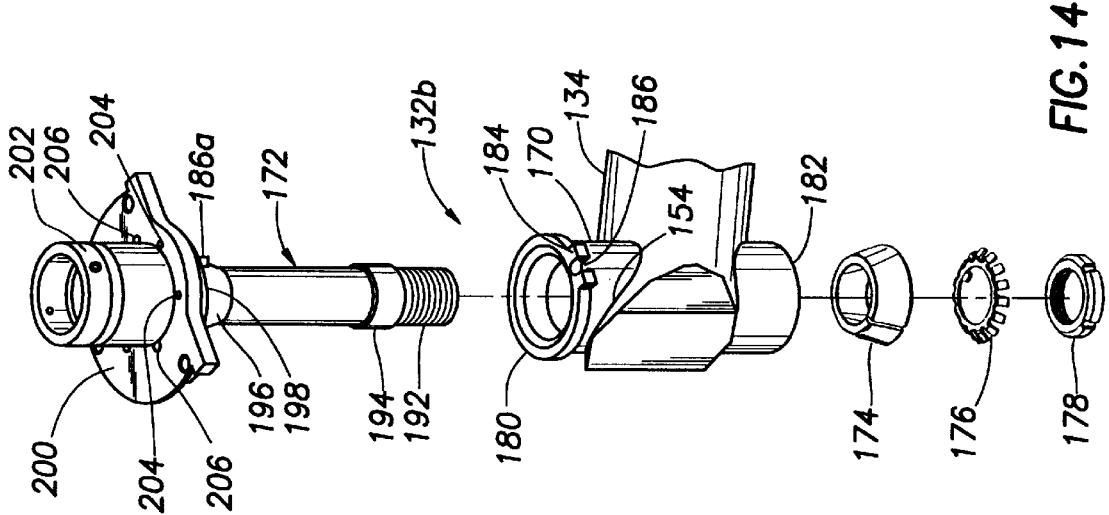
FIG. 14 is a reduced scale exploded perspective view of a second alternate embodiment of the outboard post portion of the pintle arm assembly shown in FIG. 7.

A second alternate embodiment 132b of the previously described outboard post structure 132 is illustrated in FIGS. 14–16 and includes a tubular socket member 170, a tubular mounting stud 172, a split annular tapered collet 174, a lock nut washer 176, and a lock nut 178. As will be seen, the outboard post structure 132b desirably combines the mounting rigidity attribute of the previously described outboard post structure 132 with the replaceability attribute of the previously described outboard post structure 132a.

The tubular socket member 170 is received and suitably welded within the bore 154 extending through the outboard end of the support tube 134, and has an externally flanged open upper end 180, and an unflanged open lower end 182. A locating tab 184, having an outer end notch 186 therein, projects radially outwardly from the flanged upper end 180. As can best be seen in FIG. 16, an upper end portion 188 of the interior side surface of the socket member 170 is conically tapered in a downward and radially inward direction, and a lower end portion 190 of the interior side surface of the socket member 170 is conically tapered in an upward and radially inward direction.

The tubular mounting stud 172 has an externally threaded lower end section 192 positioned immediately below a radially enlarged annular external boss 194. Spaced upwardly apart from the boss 194 is a conically enlarged annular portion 196 having an upwardly and radially outwardly tapered outer side surface. Conically enlarged portion 196 is positioned immediately below an annular flange 198 having a downwardly projecting peripheral locating pin portion 186a thereon. An azimuth stop plate 200 circumscribes an upper end portion 202 of the tubular stud 172 and is secured to the top side of the flange 198, in a predetermined angular relationship therewith, by a pair of vertically oriented pins 204 received in corresponding aligned openings in the azimuth stop plate 200 and the underlying flange 198. The upper end portion 202 of the tubular stud 172 is configured in a suitable manner permitting it to be rotatably received in a yoke portion of the machine gun 34a.

Tubular mounting stud 172 is removably installed in the socket member 170 by inserting the threaded lower end 192 of the stud 172 downwardly into the socket member 170 in a manner placing the locating pin 186a in the outer tab end notch 186 (see FIG. 15) and bringing the conically tapered outer side surface of the stud portion 196 into complementary engagement with the upper conically tapered interior side surface portion 188 of the socket member 170. The collet member 174 is then pushed upwardly onto the threaded lower stud end portion 192 until the collet member 174 reaches its FIG. 16 position in which it upwardly bears against the annular bottom side surface of the boss 194 and complementarily engages the lower conically tapered interior side surface portion 190 of the socket member 170. Finally, the lock nut washer 176 and lock nut 178 are placed and threaded onto the downwardly projecting threaded stud end section 192. Before tightening the lock nut 178, stud 172 with the attached azimuth stop plate 200 (and the associated machine gun and its gun mount) can be aligned in azimuth (bore sighted) by adjusting azimuth adjustment screws 208 operatively bearing against the locating pin 186a (see FIG. 15). The lock nut 178 is then tightened onto the threaded stud section 192.

This tightening of the lock nut 178 pulls the upper conical stud portion 196 into forcible engagement with the tapered interior socket surface 188, and at the same time axially and radially tightens the collet member 174 against a lower end portion of the stud 172. In turn, this firmly braces the installed stud 172 against both axial and radially play relative to the socket 170 and thus the balance of the pintle arm assembly 32a. In the event that the stud 172 becomes worn, it may be easily and quickly replaced by simply removing the nut 178, pulling the stud 172 out of the socket 170, and then installing a replacement stud in the socket 170.

Returning now to FIG. 7, the pintle arm assembly 32a, like the identical pintle arm assembly 32b, also includes a detent structure which, as later described herein, is utilized to releasably lock the pintle arm assembly 32a in a selectively variable rotational orientation about the vertical axis 137. This detent structure includes a detent assembly 210 mounted on the top side of the inboard post structure flange 152, and a lock ring member 212 sized to closely circumscribe the vertically intermediate portion 140 of the inboard post structure 130 and underlie the laterally enlarged top end portion 144 of the inboard post structure 130.

With reference now to FIGS. 7 and 10–12, the detent assembly 210 includes a T-handle assembly 214 having an elongated base plate 216 with a tubular boss 218 projecting upwardly from its top side. Boss 218 is received and suitably anchored within the open lower end of an internally threaded tubular handle body 220 having an open upper end 222 from which a diametrically opposite pair of gripping projections 224 radially outwardly project. The base plate 216 rests on the top side Of the inboard post structure flange 152. A bolt 226 having an enlarged head portion 228 and an externally threaded lower end 230 extends downwardly through the interior of the body 220 and is threaded into an opening 232 (see FIG. 8) in the inboard post structure flange 152. Within the interior of the handle body 220, the bolt 226 is outwardly circumscribed by a schematically depicted compression spring 234 which bears at its opposite ends against an annular washer 236 (on the underside of the bolt head 228) and the top end of the boss 218. A cap 238 is pressed into the open top end 222 of the handle body 220.

The detent assembly 210 also includes a pair of expansion pins 240 having radially expandable cylindrical bodies 242 to the top ends of which rotatable latch handles 244 are operatively secured. The expansion pin bodies 242 extend downwardly through corresponding openings 246 in the base plate 216 and underlying openings 248 (see FIG. 8) in the inboard post structure flange 152. With the latch handles 244 in locking positions, the pin bodies 242 are radially expanded to lock them in openings in which they are received. However, the latch handles 244 may be manually rotated, as indicated by the arrows 244a in FIG. 12, to cause radial compression of the pin bodies 242 and thereby permit their removal from such openings.

The compression spring 234 resiliently biases the base plate 216 downwardly against the top side of the flange 152. As can best be seen in FIG. 10, with the base plate 216 in this downwardly biased position, lower end portions of the expansion pin bodies 242 project downwardly beyond the underside of the inboard post structure flange 152. However, when the latch handles 244 are pivoted to their release positions, the handle assembly 214 may be pulled upwardly away from the top side of the flange 152, against the resilient resistance of the compression spring 234, to thereby pull the lower ends of the pin bodies 242 upwardly into the interiors of the flange openings 248. When the handle assembly 214 is then released, the spring 234 downwardly drives it back to its original position in which lower end portions of the pin bodies 242 project downwardly beyond the underside of the inboard post structure flange 152 as may best be seen in FIG. 10.

Referring now to FIGS. 7–10, the lock ring 212 has a circular central opening 250 sized to complementarily receive the intermediate tubular portion 140 of the inboard post structure 130 as later described herein. A circumferentially spaced series of circularly cross-sectioned pin openings 252, illustratively having a circumferential spacing of forty five degrees between the pin openings 252 in each adjacent pair thereof, axially extend through the body of the lock ring between its top and bottom sides. A circumferentially spaced series of bolt recesses 254, and underlying bolt holes 256, are interdigitated with the openings 252 and also extend between the top and bottom sides of the lock ring 212. A diametrically opposed pair of recesses 254a have roll pin receiving openings (not visible) underlying them.

The pintle arm assembly 32a is operatively installed on the pintle mounting block structure 98 by placing the lock ring 212, with a suitable spacer plate 257 on its underside, on the top side of the pintle mounting block structure 98 with the central locking ring opening 250 in overlying alignment with the mounting hole 100 in the block structure 98, and the locking ring bolt holes 256 in overlying alignment with internally threaded bolt openings 258 (see FIGS. 3 and 9) extending downwardly into the top side of the pintle mounting block structure 98. Bolts 260 (see FIG. 10) are then extended downwardly through the lock ring holes 256 and threaded into the underlying pintle mounting block structure holes 258 to anchor the lock ring 212 in place on the top side of the pintle mounting block structure 98. Additionally, roll pins (not shown) are operatively inserted into the roll pin openings underlying the pair of recesses 254a.

Figure 9:
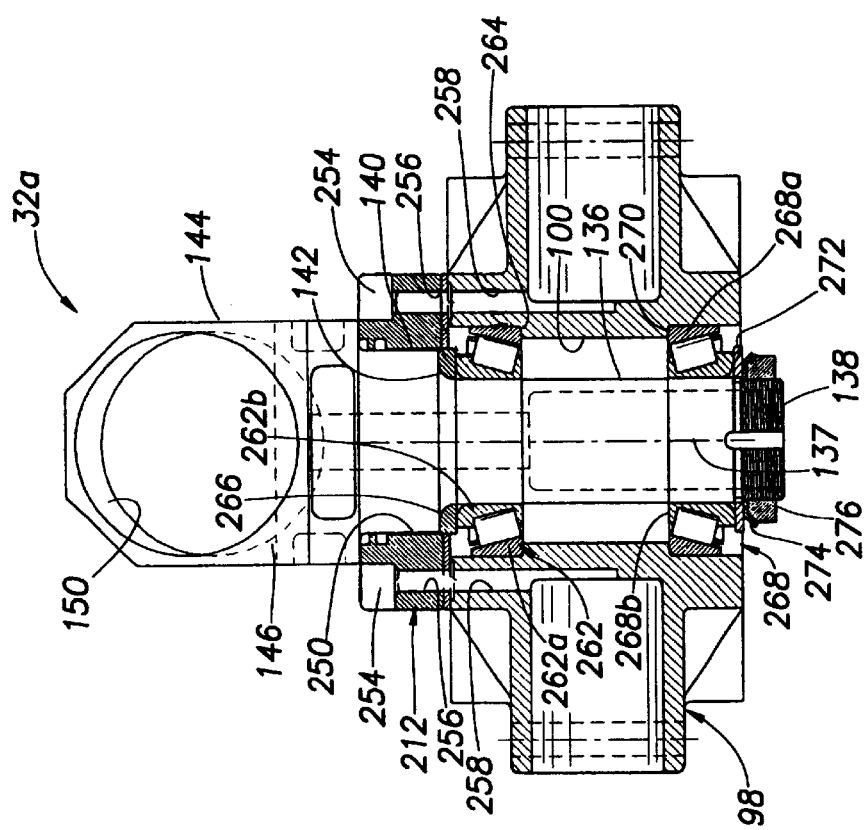
FIG. 9 is an enlarged scale cross-sectional view through the FIG. 8 apparatus in its assembled state and is taken generally along line 9—9 of FIG. 8.

As best illustrated in FIG. 9, an upper annular tapered roller bearing structure 262 is operatively disposed within an upper portion of the pintle mounting block opening 100, with the lower annular race portion 262a of the bearing resting on an annular, upwardly facing interior ledge 264 therein. A thrust ring 266 rests on the top side of the upper cone portion 262b of the bearing structure 262. The upper annular race portion 268a of a lower tapered roller bearing structure 268 is retained within a lower end portion of the mounting block structure opening 100 and upwardly engages a downwardly facing annular shoulder 270 within the interior of the opening 100.

Figure 8:
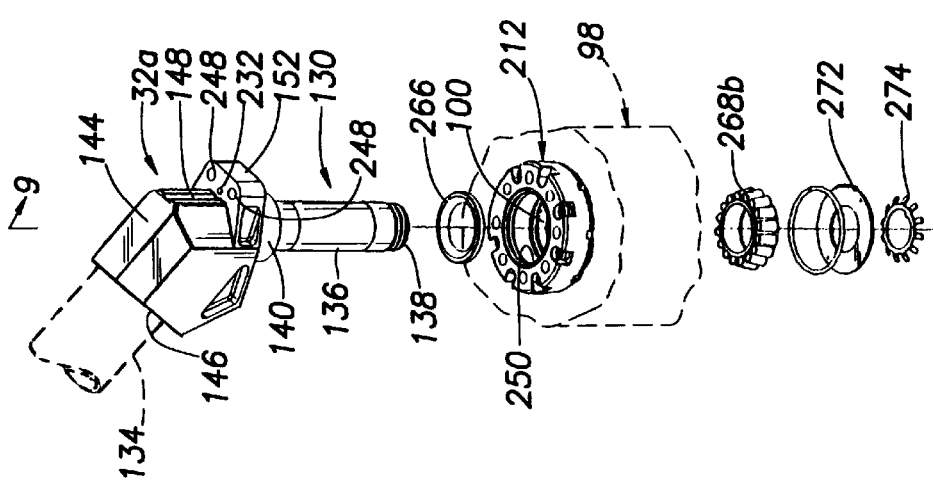
FIG. 8 is a partially exploded and phantomed perspective view of the lock ring, an inner end portion of the pintle arm assembly, and securement apparatus used to rotatable secure the inner pintle arm assembly end portion to an end portion of the central plank section.

With reference now to FIGS. 8 and 9, with the lock ring 212 bolted and pinned to the top side of the pintle mounting block structure 98, the tubular lower end portion 136 of the inboard post structure portion 130 of the pintle arm assembly 32a is lowered through the aligned lock ring and mounting block openings 250 and 100 until the annular arcuate shoulder surface 142 of the inboard post structure comes to rest on the top side of the thrust ring 266, and the threaded lower end section 138 of the inboard post structure projects downwardly beyond the lower side of the pintle mounting block structure 98 as illustrated in FIG. 9.

The lower cone portion 268b of the annular tapered roller bearing structure 268 is placed over the threaded stud end 138 and operatively placed in the bearing race portion 268a. An annular flat washer 272, lock nut washer 272 and lock nut 276 are then sequentially installed on the lower stud end 138 and the lock nut 276 is upwardly tightened onto the stud as cross-sectionally shown in FIG. 9. The indicated use of the axially oppositely oriented upper and lower tapered roller bearing structures 262,268 causes this tightening, which creates the exertion of axially inwardly directed forces on the upper and lower bearing cone portions 262b and 268b, to very firmly brace the inboard post structure 130 against both vertical and horizontal play relative to the lock ring 212 and the underlying pintle mounting block structure 98, while at the same permitting the pintle arm assembly 32a to be freely rotated about the vertical axis 137.

When the inboard post structure 130 is initially installed on the pintle mounting block structure 98 in the foregoing manner, the lower end portions of the expansion pin bodies 242 that project downwardly from the underside of the inboard post structure flange 152 (see FIG. 10) are initially placed and locked within a selected adjacent pair of lock ring holes 252—for example the holes 252a and 252b—to thereby rotationally lock the pintle arm assembly 32a in a selected rotational orientation relative to the vertical axis 137. When it is later desired to change the rotational orientation of the pintle arm assembly 32a about the vertical axis 137, the expansion latch members 244 are rotated to their unlocking positions as indicated by the arrows 244a in FIG. 12, the handle assembly 214 is pulled upwardly to lift the pin bodies 242 out of the lock ring holes 252a,252b and rotationally free the pintle arm assembly 32a. With the handle assembly 214 maintained in this lifted orientation, the pintle arm assembly 32a is rotated about the vertical axis 137, as indicated by the arrow 278 in FIG. 10, until the lower ends of the pin bodies 242 are in overlying alignment with another adjacent pair of lock ring pin openings 252—for example the pin openings 252c and 252d.

The lifted handle assembly 214 is then released to permit the compression spring 234 (see FIG. 12) to downwardly drive the pin bodies 242 into the lock ring openings 252c, 252d. The rotationally reoriented pintle arm assembly 32a is then locked into place by rotating the expansion pin latch handles 244 to their locking orientations, thereby radially expanding the pin bodies 242 within the lock ring pin openings 252c,252d.

Figure 17:
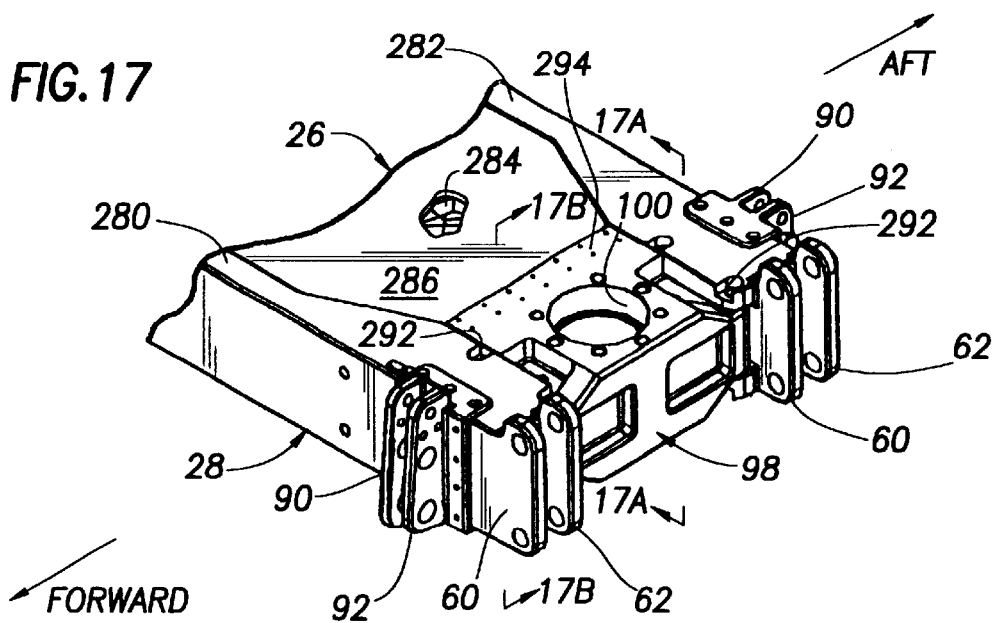
FIG. 17 is a perspective view of an end portion of the central plank section.
Figure 17A:
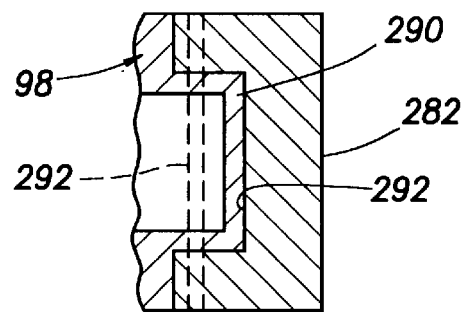
FIGS. 17A and 17B are enlarged scale schematic cross-sectional views through the central plank section end portion respectively taken along lines 17A—17A and 17B—17B of FIG. 17.
Figure 17B:
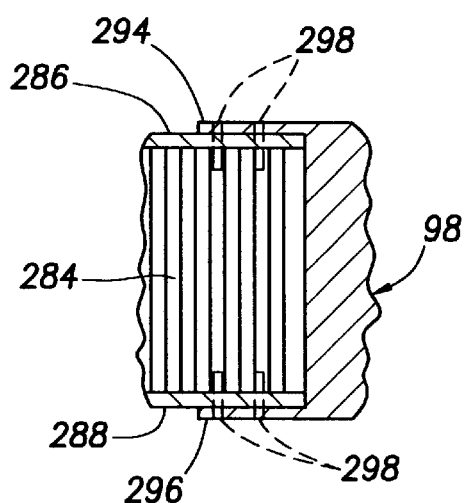

Referring now to FIGS. 17–17B, the central support plank section 26 is formed from elongated front and rear spar members 280 and 282 between which a honeycombed metal core section 284 is secured, the core section 284 having metal skin portions 286,288 respectively extending along its top and bottom sides. According to a feature of the present invention, the pintle mounting block structures 98 positioned at the opposite ends 28,30 of the central support plank section 26 are secured thereto in a unique manner that efficiently transfers end loads on the plank section 26 (i.e., loads from the machine guns 34a,34b and loads imposed by the outboard plank sections 48 and their supported weaponry) to the plank core section 284 from the front and rear spar members 280 and 282, thereby desirably lessening the loads which the spar members must carry.

This load transfer is representatively effected by forming on the front and rear sides of each pintle mounting block structure 98 horizontally outwardly projecting tongues 290 (only one of which is shown in FIG. 17A) which are received in complementarily configured grooves 292 formed in the horizontally inner sides of the adjacent outer end portions of the spar members 280- and 282. The tongues 290 are firmly locked in their associated spar member grooves 292 by means of schematically depicted fastening members, such as expansion bolts 292, vertically extended through the spar members 280,282 and the pintle block tongues 290 received in the spar grooves 292. As best illustrated in FIG. 17B, each pintle block mounting structure 98 has, on its horizontally inner side, top and bottom flanges 294,296 that extend outwardly over outer end portions of the top and bottom core skins 286,288 and are secured thereto by suitable schematically depicted high strength fasteners 298. As can be seen, in this manner at least major portions of vertical loads imposed on the outer ends of the spar members 280,282 and/or the pintle mounting blocks 98 are transferred to the plank core section 284 as opposed to being borne by the spar members.

Compared to conventional aircraft in-cabin machine gun mounting structures, the pintle arm assembly 32 of the present invention provides a variety of advantages. For example, it is supported for rotation about a vertical axis and may be releasably locked in a variety of selectively variable rotational orientations by its associated detent structure. The ability to rotate the pintle arm assembly about such vertical axis uniquely permits its associated machine gun to be horizontally swung to a stowed orientation within the cabin area—it is not necessary to lift the gun and pivot the lifted gun about a horizontal axis into the cabin area.

Additionally, the double tapered roller bearing mounting of the inboard post structure portion of the pintle assembly permits free rotation of the pintle arm assembly about the vertical pivot axis, while at the same time substantially eliminating both vertical and horizontal play of the pintle assembly relative to its underlying support structure. This substantially improves the aiming accuracy of the pintle-mounted machine gun during firing thereof, and additionally improves mount durability. Moreover, the described embodiments of the outboard post structure 132 provides the pintle arm assembly 32 with desirable rigidity and replacement attributes. Further, the unique method and apparatus utilized to mount the central support plank section on the cabin floor efficiently transfers the gun/pintle assembly load to structural apparatus underlying the cabin floor.

While the pintle arm assembly illustrated and described herein has been representatively mounted on an armament support plank within the cabin area of an aircraft, it will be readily appreciated by those of skill in this particular art that the pintle arm assembly of the present invention could also be advantageously utilized in non-aircraft applications in which the pintle assembly was operatively mounted on support structures other than an armament support plank such as, for example, a stationary ground mounting structure or a support structure on a land vehicle such as a jeep or tank.

The foregoing detailed description is to be clearly understood as being given by way Of illustration and example, the spirit and scope of the present invention being limited solely by the appended claims.

What is claimed is:

1. Aircraft armament apparatus comprising:
   a support plank structure mountable on the floor of an aircraft cabin area in a manner such that said support plank structure longitudinally extends generally between opposite outer side wall door openings of the cabin area, said support plank structure having an outer end portion with top and bottom sides, and a mounting opening extending vertically through said outer end portion of said support plank structure about a vertical axis; and
   a pintle arm assembly for supporting a machine gun, said pintle arm assembly including:
      a vertically orientable inboard post structure having a lower end section receivable in said mounting opening,
      an outboard post structure horizontally offset from said inboard post structure and being supportingly connectable to the machine gun,
      an elongated support member having opposite first and second end portions, said elongated support member extending between said inboard and outboard post structures with said first and second opposite end portions being respectively secured thereto,
      securement structure for securing said lower end section of said inboard post structure within said mounting opening of said support plank structure in a manner such that said pintle arm assembly projects upwardly from said outer end portion of said support plank structure and is rotatable relative thereto about said vertical axis, and
      locking structure operative to releasably lock said pintle arm assembly relative to said outer end portion of said support plank structure in a selectively variable rotational orientation about said vertical axis.

2. The aircraft armament apparatus of claim 1 wherein said outboard post structure is upwardly offset from said inboard post structure.

3. The aircraft armament apparatus of claim 1 wherein said securement structure includes:
   first and second annular tapered bearing structures having cone portions and being receivable in said mounting opening in a circumscribing, axially spaced apart relationship on said lower end section of said inboard post structure, and in an axially oppositely oriented relationship with one another, and
   a tightening structure operative to axially lock said lower end section of said inboard post structure within said mounting opening and exert axially inwardly directed forces on said cone portions of said first and second annular tapered bearing structures.

4. The aircraft armament apparatus of claim 3 wherein said first and second annular tapered bearing structures are roller bearing structures.

5. The aircraft armament apparatus of claim 3 wherein:
   said lower end section of said inboard post structure has a threaded bottom end portion, and
   said tightening structure includes a nut member tightenable onto said threaded bottom end portion.

6. The aircraft armament apparatus of claim 5 wherein:
   said tightening structure further includes washer apparatus positionable against one of said cone portions, and
   said nut member is a lock nut tightenable onto said threaded bottom end portion of said inboard post structure with said washer apparatus interposed between said lock nut and said one of said cone portions.

7. The aircraft armament apparatus of claim 1 wherein said locking structure includes:
   a first detent structure having a spaced series of openings therein,
   a second detent structure having a locking member disposed thereon and movable into and out of a selectively variable one of said series of openings, and
   attachment structure for fixedly attaching one of said first and second detent structures to said support plank structure outer end portion, and for attaching the other of said first and second detent structures to said inboard post structure for rotation therewith about said vertical axis to receivingly align a selected one of said series of openings with said locking member.

8. The aircraft armament apparatus of claim 7 wherein said attachment structure is operative to fixedly attach said first detent structure to said support plank structure outer end portion, and to attach said second detent structure to said inboard post structure.

9. The aircraft armament apparatus of claim 8 wherein:
   said first detent structure is a lock ring member through which said lower end section of said inboard post structure may be extended, said series of openings are circumferentially spaced about said lock ring member and extend axially therethrough, and said locking member is a pin member.

10. The aircraft armament apparatus of claim 9 wherein said pin member is a spring-loaded expansion pin member.

11. The aircraft armament apparatus of claim 1 wherein said outboard post structure includes a stud member rotatably connectable to the machine gun and fixedly secured to said second end portion of said support member.

12. The aircraft armament apparatus of claim 1 wherein said outboard post structure includes:

a socket member anchored to said second end portion of said support member, a stud member removably receivable in said socket member and rotatably connectable to the machine gun, and fastening structure for releasably retaining said stud member in said socket member.

13. The aircraft armament apparatus of claim 12 wherein:

said socket member extends along an axis and has first and second axially spaced apart conically tapered annular interior side surface areas, said stud member has a radially enlarged external portion with a conically tapered outer side surface portion positioned and configured to complementarily engage said first conically tapered annular interior side surface area of said socket member when said stud member is operatively received in said socket member, and said fastening structure includes a lock nut threadable onto an end of said stud member, and a split annular tapered collet member positionable around said stud member and being axially drivable into engagement with said second tapered annular interior side surface area of said socket member by said lock nut as said lock nut is threadingly tightened onto said stud member end.

14. The aircraft armament apparatus of claim 1 further comprising an outboard plank section removably connectable to said outer end portion of said support plank structure to define a longitudinal extension thereof.

15. The aircraft armament apparatus of claim 14 wherein said outboard plank section has a downwardly and longitudinally outwardly sloping top side surface.

16. The aircraft armament apparatus of claim 14 further comprising support structures disposed on said outboard plank section and useable to removably secure weaponry thereto.

17. Aircraft armament support plank apparatus comprising:

an elongated core structure having opposite front and rear side edges, top and bottom sides extending between said opposite front and rear side edges, and an end portion;

first and second spar members secured to and longitudinally extending along said opposite front and rear side edges of said core structure, said first and second spar members having end portions longitudinally projecting outwardly beyond said core structure end portion; and a machine gun pintle mounting block structure anchored between said spar member end portions, said pintle mounting block structure having top and bottom sides between which a pintle mounting opening extends, said pintle mounting opening having conically tapered inner side surface portions at upper and lower ends thereof.

18. The aircraft armament support plank apparatus of claim 17 wherein said pintle mounting block structure and said spar member end portions have interlocked sections precluding appreciable relative vertical movement between said pintle mounting block structure and said spar member end portions.

19. Aircraft armament support plank apparatus comprising:

an elongated core structure having opposite front and rear side edges, top and bottom sides extending between said opposite front and rear side edges, and an end portion;

first and second spar members secured to and longitudinally extending along said opposite front and rear side edges Of said core structure, said first and second spar members having end portions longitudinally projecting outwardly beyond said core structure end portion; and a machine gun pintle mounting block structure anchored between said spar member end portions, said pintle mounting block structure having top and bottom sides between which a pintle mounting opening extends, said pintle mounting block structure and said spar member end portions having interlocked sections precluding appreciable relative vertical movement between said pintle mounting block structure and said spar member end portions, said pintle mounting block structure having front and rear side edges with tongue sections projecting outwardly therefrom, and said spar member end portions having recesses formed therein and complementarily receiving said tongue portions.

20. The aircraft armament support plank apparatus of claim 19 further comprising fastening members extending through said tongue sections and portions of said spar member end portions disposed above and below said tongue sections.

21. Aircraft armament support plank apparatus comprising:

an elongated core structure having opposite front and rear side edges, top and bottom sides extending between said opposite front and rear side edges, and an end portion;

first and second spar members secured to and longitudinally extending along said opposite front and rear side edges of said core structure, said first and second spar members having end portions longitudinally projecting outwardly beyond said core structure end portion; and a machine gun pintle mounting block structure anchored between said spar member end portions, said pintle mounting block structure having top and bottom sides between which a pintle mounting opening extends, said pintle mounting block structure and said spar member end portions having interlocked sections precluding appreciable relative vertical movement between said pintle mounting block structure and said spar member end portions, said core structure including a central core portion, said top and bottom sides of said core structure being defined by top and bottom skin structures between which said central core portion is sandwiched, and said pintle mounting block structure having top and bottom flange portions that outwardly overlap and are anchored to portions of said top and bottom skin structures.

22. The aircraft armament support plank apparatus of claim 21 wherein said top and bottom flange portions are anchored to said portions of said top and bottom skin structures by a spaced series of fastening structures extending therethrough.

23. The aircraft armament support plank apparatus of claim 21 wherein said central core portion has a honeycombed configuration.

24. Aircraft armament apparatus comprising:

a support plank structure mountable on the floor of an aircraft cabin area in a manner such that said support plank structure longitudinally extends generally between opposite outer side wall door openings of the cabin area, said support plank structure having an end portion with top and bottom sides;

a pintle assembly for supporting a machine gun above said top side of said end portion of said support plank structure for rotation relative thereto about a vertical axis, said pintle assembly including a first end portion, and a second end portion supportingly connectable to the machine gun;

securement structure for securing said first end portion of said pintle assembly to said end portion of said support plank structure in a manner such that said pintle assembly projects upwardly from said top side of said outer end portion of said support plank structure and is rotatable relative thereto about said vertical axis; and locking structure operative to releasably lock said pintle assembly relative to said end portion of said support plank structure in a selectively variable rotational orientation about said vertical axis.

25. The aircraft armament apparatus of claim 24 wherein: said second portion of said pintle assembly is horizontally offset from said first portion thereof in a manner permitting said machine gun mounted on said second end portion of said pintle assembly to be swung inwardly and outwardly through one of the outer side wall openings of the cabin area when said support plank structure is operatively mounted on the floor of the cabin area and said pintle assembly is rotated about said vertical axis.

26. The aircraft armament apparatus of claim 25 wherein said second portion of said pintle assembly is horizontally and upwardly offset from said first portion thereof.

27. The aircraft armament apparatus of claim 24 wherein:

said end portion Of said support plank structure has an opening extending therethrough from said top side to said bottom side and being adapted to receive said first portion of said pintle assembly, said securement structure includes first and second annular tapered bearing structures positionable in said opening, in an axially spaced relationship, to circumscribe and rotationally support said first portion of said pintle assembly, and a tightening structure operative to axially lock said first portion of said pintle assembly in said opening and exert axially inwardly directed forces on said bearing structures.

28. The aircraft armament apparatus of claim 24 wherein said locking structure includes:

a first detent structure having a spaced series of openings therein, a second detent structure having a locking member disposed thereon and movable into and out of a selectively variable one of said series of openings, and attachment structure for fixedly attaching one of said first and second detent structures to said support plank structure end portion, and for attaching the other of said first and second detent structures to said first portion Of said pintle assembly for rotation therewith about said vertical axis to receivingly align a selected one of said series of openings with said locking member.

29. The aircraft armament apparatus of claim 24 wherein:

said support plank structure has an elongated core structure having an end and opposite front and rear side edges, first and second spar members secured to and longitudinally extending along said opposite front and rear side edges of said core structure, said first and second spar members having end portions longitudinally projecting outwardly beyond said core structure end, and said aircraft armament apparatus further comprises a machine gun pintle mounting block structure which is a component separate from said core structure and is received and anchored between said spar member end portions, said pintle mounting block structure and said spar member end portions defining said end portion of said support plank structure, and said pintle mounting block structure having top and bottom sides between which a pintle mounting opening extends, said pintle mounting opening being operative to rotationally receive said first portion of said pintle assembly.

* * * * *